May 17, 1949.  C. A. LAPP  2,470,499
PIPE FITTING
Filed April 19, 1947  2 Sheets-Sheet 1
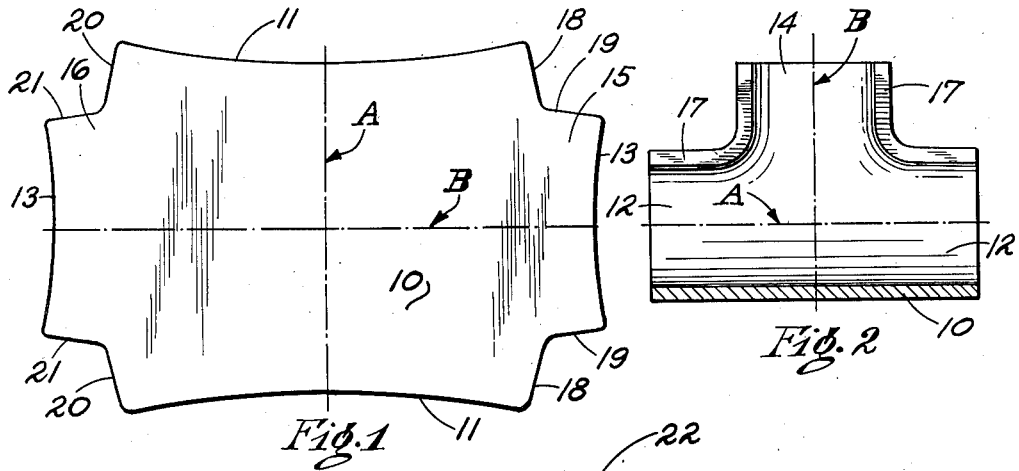
Fig. 1
Fig. 2
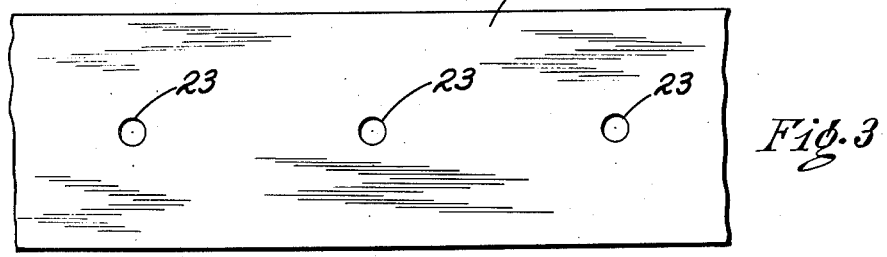
Fig. 3
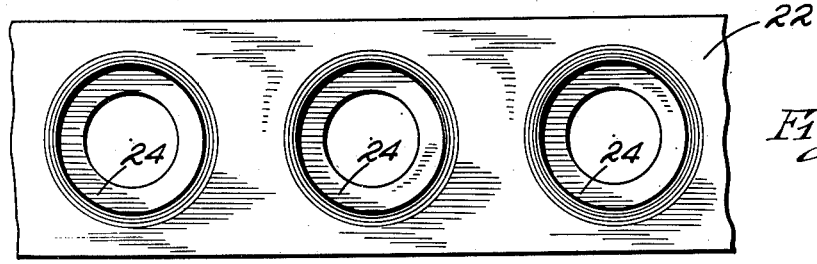
Fig. 4
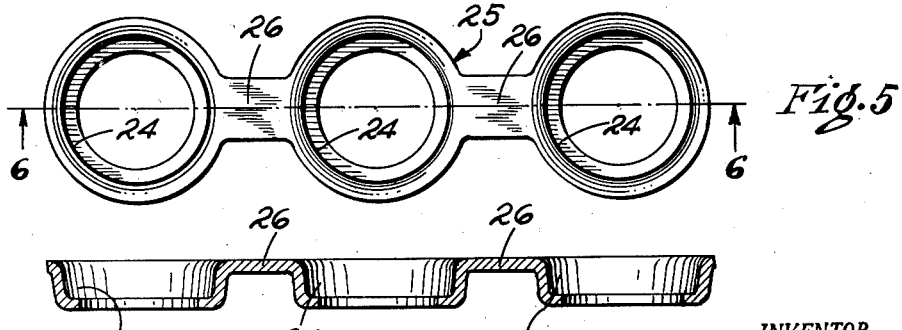
Fig. 5
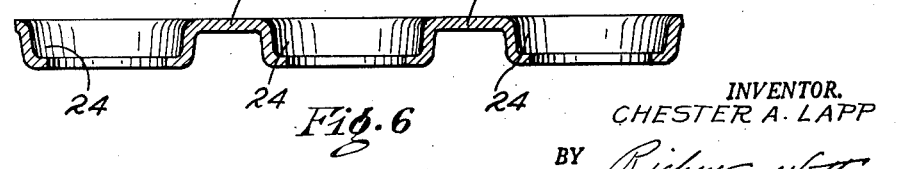
Fig. 6
INVENTOR.
CHESTER A. LAPP
BY Richey & Watts
ATTORNEYS May 17, 1949.  C. A. LAPP  2,470,499
PIPE FITTING Filed April 19, 1947  2 Sheets-Sheet 2

INVENTOR.
CHESTER A. LAPP
BY Richey & Watts
ATTORNEYS

Patented May 17, 1949

2,470,499

UNITED STATES PATENT OFFICE 2,470,499

PIPE FITTING

Chester A. Lapp, Cleveland, Ohio

Application April 19, 1947, Serial No. 742,669

10 Claims. (Cl. 285—210)

This invention relates to improvements in fabricated sheet metal pipe fittings and to the method of manufacture thereof.

In my co-pending application, Serial No. 695,766, filed September 9, 1946, the disclosure contemplates a blank, drawn and formed in configuration of a tubular body having a butt brazed seam therein and reenforcing collars on the free ends thereof.

The present invention comprehends a fitting that embodies, in addition to certain basic features of construction disclosed in the aforesaid application, an improved and more comprehensive organization of parts including a seam reenforcing strip combined in a unitary blank with one or more ferrules, a seam construction which will withstand greater internal pressures than available in like fittings heretofore constructed and a reenforcing seam and ferrule blank which is adaptable, with slight structural modification, for use on all of the various types of pipe or conduit fitting.

The invention is further directed toward a method of assembly wherein one of the parts constitutes the supporting element for the other during the brazing operation and a method in which the seam cover strip and end rings are simultaneously pressed in seated relation with the stamping that forms the body of the fitting.

Other objects and advantages reside in the specific construction and agroupment of elements peculiar to the structure as will become apparent from an examination of the following description and appended drawings which illustrate a fitting that embodies such principles of the invention as are common to other forms of fittings of the same class.

Referring to the drawings:

Fig. 1 is a plan view of a blank for the body of the fitting;

Fig. 2 is a vertical section through the formed part pressed therefrom;

Fig. 3 is a fragmentary portion of a strip of sheet metal showing the first step in the fabrication of the reenforcing ring unit;

Fig. 4 is a plan view of the strip illustrated in Fig. 3 after a drawing operation has been performed thereon;

Fig. 5 is a plan view of the blank struck from the sheet illustrated in Fig. 4;

Fig. 6 is a longitudinal section through the blank shown in Fig. 5;

Figure 7:
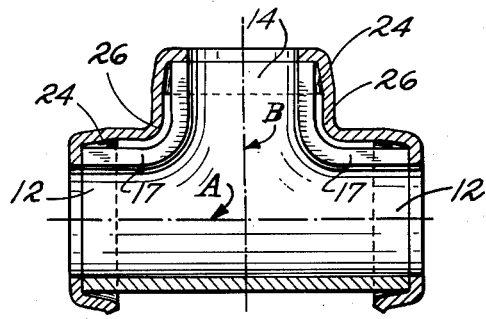
Fig. 7 is a vertical sectional view through the body of the fitting and reenforcing ring unit illustrating, somewhat schematically, the relation of the parts incident the assembly thereof.
Figure 8:
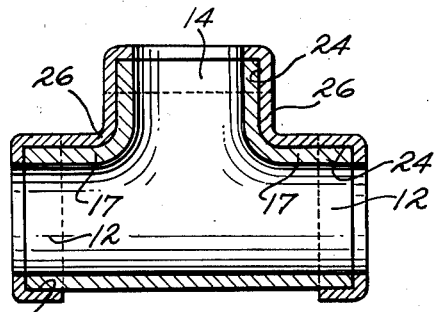
Fig. 8 is a vertical sectional view of the assembled unit after brazing.
Figure 9:
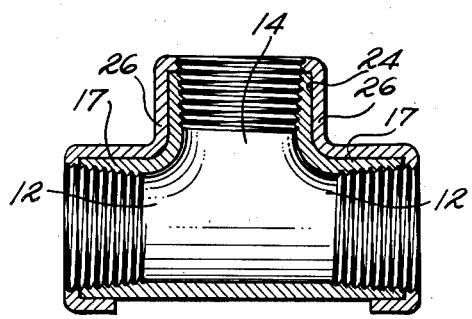
Fig. 9 is a vertical sectional view of the assembled unit after the threading operation.
Figure 10:
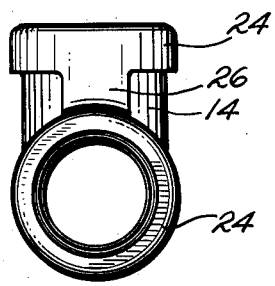
Fig. 10 is an end elevational view of the fitting illustrated in Fig. 9.
Figure 11:
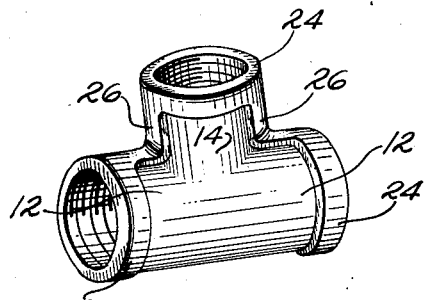
Fig. 11 is a view in perspective of the finished fitting.

Referring first to Fig. 1, the blank 10 for the T-fitting is formed with arcuate sides 11 designed to produce the aligned branches 12 of the fitting (Fig. 2) when the metal about the axis A is pressed into cylindrical form and curved ends 13 configured to produce the branch 14 when the tabs 15 and 16 are bent about the major axis B of the blank. The seams 17 in the tubular body illustrated in Fig. 2 are formed when the walls 18 and 19 of the blank are brought into abutting engagement with the walls 20 and 21 in the opposed end of the blank.

The reenforcing ferrules and seam cover plate are formed as a unitary structure, the stamping being struck from a sheet metal plate 22 which is first pierced with relatively small holes 23 (Fig. 3) developed to coincide upon assembly with the axis A and B of the semi-formed fitting. The plate 22 is next die struck to draw and stretch the metal surrounding the holes 23 into the cupped sections 24 illustrated in Fig. 6, then sheared and punched to form the blank 25 (Fig. 5). In the latter operation, the hole in the base of each cup is trimmed to the diameter of the opening in the ends of the branches 12 and 14 and tie bars, constituting seam reenforcing strips 26, are struck from the portion of the plate intermediate the cups. The semi-formed blank 25 is next placed into a fixture which is designed to bend the strips 26 and fold the blank into position for telescopic engagement of the cups with the end portions of the branches of the T, then under application inward pressure press the bell mouth portions of the cups into parallel intimate engagement with the outer wall of the tubular branches of the T fitting at the same time deformatively pressing the strips 26 into tight engagement with the portions of the walls of the fitting contiguous the seams 17.

With the parts thus assembled, copper, or other fusible metal wires are placed in the customary manner about the body of the fitting adjacent the joints therein and the unit is then placed in a brazing furnace. The cups are closed in over the ends of the branches under extremely high pressure during the final assembly of the fitting and are moreover tied together by the strips 26 which are likewise forced into intimate contact with the body of the fitting and conformed thereto; hence, the assembly constitutes a self-sustained unit which may be passed through the brazing furnace without the use of a supporting fixture or clamping mechanisms.

Since the fitting is pressed from stock of a uniform thickness and the configuration thereof is accurately controlled by the forming dies, the bore in the throat of each branch may be held to close tolerances and the part may be tapped after removal from the brazing furnace without first drilling and reaming as is necessary in cast or forged products. The tapping operation may be performed in a more accurate and expeditious manner than possible with cast fittings since the die pressed collars are concentric with the bore and the outer surfaces thereof are of a constant diameter and free from scale, burrs, or other irregularities.

Figure 12:
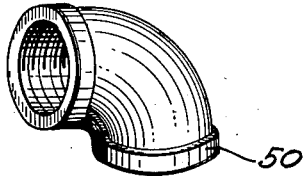
Fig. 12 is a perspective view of a fitting of another form illustrating the application of the improved reenforcing ring.
Figure 13:
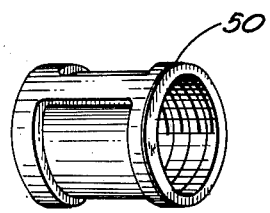
Fig. 13 is a perspective view of another form of fitting embodying the invention.

As illustrated in Figs. 12 and 13, the blanks for the body of the fitting are pressed into tubular form and the free ends thereof are then capped with a unitary cup and strap stamping 50 similar in structure to that hereto described. The stamping 50 is then pressed in place and drawn to conform to the contour of the contiguous portion of the body. Thereafter the parts are brazed and machined in a manner similar to that employed in finishing the T-fitting.

The pipe T, elbow and nipple disclosed herein are merely illustrative of some of the environs within which the improved structure may be applied, it will be recognized, however, that other fittings and machine parts may be constructed in a similar manner and it will be understood that such parts are contemplated as falling within the scope and spirit of the appended claims.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A pipe fitting comprising a tubular body formed from a pressed sheet metal blank, the walls of the abutting edges of the formed blank defining a seam, perforate cups on the ends of said tubular body and a strip overlying the portion of the seam intermediate the cups.

2. A pipe fitting comprising a tubular body formed from a sheet metal stamping, said body having a seam therein, cups brazed on the ends of said tubular body and over portions of said seam and a metal strip brazed on said body over the remaining portion of said seam.

3. A sheet metal pipe fitting embodying a plurality of tubular end sections, said body having a seam therein, a plurality of perforate cups united with each other by a metal strip, said cups being telescopically engaged with and brazed to the tubular end sections of the fitting, said strip overlying said seam and being brazed to the body of said fitting.

4. A pipe fitting comprising a tubular body section formed from a sheet metal blank and an end cup section formed from a second sheet metal blank, the walls of the tubular body section defining a seam, the end cup section including a strip formed for intimate engagement with a portion of the tubular body at each side of the seam, said cup section and strip being bonded to said tubular body.

5. A pressed sheet metal pipe nipple comprising a body stamping and a reenforcing member, said body being of tubular form and having a seam therein between the end portions of the tubular body, said reenforcing member being disposed in overlapped relation with the end portions of the tubular body and the seam.

6. A pipe T comprising a body of sheet metal bent into the form of a T with a joint extending between each cross arm of the T and the adjacent side of the upright, and a member pressed from a single sheet of metal comprising a central cup-shaped collar having diametrically-opposed integral strips, each strip merging with an integral terminal collar, said central collar being disposed over the end of the T upright, said terminal collars being disposed over the ends of the T cross arm, said strips being bent at the junction of the T upright and cross arms and overlying said seam, said member being bonded to said body around said collars and along said strips.

7. The method of forming a sheet metal pipe fitting comprising the steps of forming a die struck blank, drawing and forming said blank into a tubular body, forming a second die struck blank, drawing and piercing said second blank into a plurality of united perforate cups, forcing the cup portions over the ends of the tubular body and the intermediate portion against the wall of said tubular body and bonding the parts in fluid-tight securement.

8. The method of making pipe fittings comprising the steps of forming shearing a blank from sheet metal, forming said blank into a tubular body with an open seam therein, shearing and piercing a second blank from sheet metal, drawing the metal about the pierced portions of the blank into a plurality of spaced ferrules united with each other through a strip of the blank, punching the central portions of said ferrules to the size of the openings in the tubular body, bending and pressing the strip into intermediate engagement with the walls of the tubular body that define the seam and pressing the ferrules over the ends of the tubular body, then brazing the parts together.

9. The method of forming a pipe fitting comprising the steps of drawing and forming a sheet metal blank into a fitting body having a plurality of tubular nipple portions with a seam therebetween, drawing and piercing a second blank into a plurality of cup portions united by relatively narrow strips, forcing the cup portions over the body portions with the strips overlying said seam, and bonding the parts into fluid-tight securement.

10. A pipe elbow comprising a body of sheet metal bent into the form of an elbow body with a joint extending along the smaller radius of the elbow, and a member pressed from a single sheet of metal comprising a pair of cup-shaped collars joined by an integral strip, collars being disposed over the ends of the elbow body with said strip being bent and overlying said seam, said member being bonded to said body around said collars and along said strip.

CHESTER A. LAPP.

REFERENCES CITED

The following references are of record in the file of this patent:

UNITED STATES PATENTS

| Number | Name | Date |
|---|---|---|
| 124,897 | Hunsinger | Mar. 26, 1872 |
| 1,048,513 | Erickson | Dec. 31, 1912 |
| 1,518,599 | Murray | Dec. 9, 1924 |
| 1,931,162 | Kranz | Oct. 17, 1933 |
| 2,039,542 | Lindquist | May 5, 1936 |
| 2,040,628 | Recker | May 12, 1936 |